United States Patent [19]

Strain et al.

[11] 3,947,650
[45] Mar. 30, 1976

[54] GAS-INSULATED SWITCH FOR AN UNDERGROUND POWER DISTRUBUTION SYSTEM

[75] Inventors: Robert Allen Strain; Gary Lee Schurter, both of St. Louis, Mo.

[73] Assignee: International Telephone and Telegraph Corporation, New York, N.Y.

[22] Filed: Jan. 9, 1974

[21] Appl. No.: 432,064

[52] U.S. Cl. .......................... 200/148 B; 200/148 A
[51] Int. Cl.$^2$ ........................................ H01H 33/88
[58] Field of Search .................. 200/148 A, 148 G

[56] References Cited
UNITED STATES PATENTS

| | | | |
|---|---|---|---|
| 2,981,815 | 4/1961 | Leeds et al. | 200/148 B |
| 3,025,375 | 3/1962 | Frank | 200/148 B |
| 3,052,783 | 9/1962 | Buron | 200/148 B |
| 3,214,550 | 10/1965 | Easley | 200/148 A |
| 3,527,912 | 9/1970 | Jaillet | 200/148 A |
| 3,745,284 | 7/1973 | Hosokawa | 200/148 A |

FOREIGN PATENTS OR APPLICATIONS

| | | | |
|---|---|---|---|
| 369,189 | 1932 | United Kingdom | 200/148 A |

*Primary Examiner*—Robert S. Macon
*Attorney, Agent, or Firm*—James B. Raden; William J. Michals

[57] ABSTRACT

An electric switch suitable for use in underground distribution (UD) systems includes a conductive housing having at least one pair of insulated feed-through bushings mounted thereon. The bushings are adapted to receive underground conductor terminations external of the housing and electrodes of a circuit interrupter internal of the housing. The circuit interrupter is responsive to a mechanism which alternately engages and disengages the electrodes. The housing encloses a volume of electronegative gas which gas acts to extinguish the arc drawn between the electrodes during a switching operation, and to provide electrical insulation between the individual electrodes and between the electrodes and the conductive housing. The gas is maintained at a sufficiently low pressure to prevent liquefication even at low-ambient temperatures.

13 Claims, 5 Drawing Figures

GAS-INSULATED SWITCH FOR AN UNDERGROUND POWER DISTRUBUTION SYSTEM

BACKGROUND OF THE INVENTION:

This invention relates to electric switches suitable for use in underground power distribution systems and, more particularly, to gas-insulated switches utilizing electronegative gas.

Submersible power switches for use in underground distribution systems are known. These switches are used to provide means for both interrupting and completing underground power distribution circuits. Prior art underground distribution switches generally take two forms. The first of these two forms is a vacuum interrupter switch wherein the distribution switch contact or contacts engage and disengage one another in an atmospherically evacuated or vacuum environment. The vacuum environment is relied upon to provide insulation between the electrodes and to provide rapid extinction of the arc drawn between the electrodes during a switch-opening operation. However, it is known that a vacuum type interrupter switch presents substantial problems such as: (i) maintaining the vacuum integrity; (ii) providing sufficient mechanical clearance between the contact elements of the electrodes in the restricted vacuum envelope so as to permit adequate electrode contact in the closed-circuit position while assuring BIL (Basic Impulse Level) integrity in the open-circuit position; and (iii) premature circuit interruption or current-chopping which generates over voltages dangerous to the insulation integrity of the vacuum switch and the associated external electrical devices.

The second form of prior art distribution switches is the oil-filled interrupter switch wherein a volume of oil surrounds the switching electrodes within a housing. However, the attendant arcing in these oil-filled switches not only generates gas pressures within the housing which can rupture the housing but it also produces explosive gases which when combined with the combustible oil may result in a fire hazard. Additionally, these prior art oil-filled switches require periodic maintenance such as testing or changing of the oil medium.

The circuit-interrupting properties of a gas-filled circuit interrupter utilizing an electronegative gas have been known to the art as exemplified in the patent to Lingal, U.S. Pat. No. 2,757,261. An electronegative gas, such as sulphur hexafluoride (SF$_6$) poses several properties which make it eminently suitable for use in a circuit interrupter. For example, SF$_6$ is chemically and physiologically inert and non-flammable. Further, at atmospheric pressure, the dielectric strength of SF$_6$ is approximately 2.5 times that of air. Perhaps the most valuable intrinsic property of SF$_6$ is its arc-quenching capability. In a simple break interrupter, i.e., one wherein the switching is accomplished in still air, approximately 100 times as much current can be extinguished using SF$_6$ as compared to air, and when this electronegative gas is blown through the arc, even at low velocities, the effectiveness compared to a simple break, air interrupter is further multiplied to hundreds of times. The Lingal patent teaches the art that the current or voltage interrupting ability of the electronegative gas is considerably improved by simply increasing the pressure of the gas in the switch chamber; and that the interrupting ability increases almost directly with the absolute pressure.

Circuit breakers utilizing the optimum arc-extinguishing ability of an electronegative gas, such as SF$_6$, as taught by the Lingal patent, are known to the art as exemplified in U.S. Pat. No. 3,749,869. These circuit breakers have increasingly been used at high gas densities and high gas pressures in order to optimize the desirable effects as taught in the Lingal patent. As well known by those skilled in the art, however, when an electronegative gas such as SF$_6$ is utilized at high pressure, there results the hazard that at low ambient temperatures, the gas may become liquefied, and this necessarily will cause a drop in its operating pressure. The drop of operating pressure is, of course, undesired, as the possibility exists that the circuit breaker will be incapable of interrupting its current and voltage ratings.

As illustrated in the U.S. Pat. No. 3,749,869, the prior art attacks the above-described liquefication problem by resorting to means for adding external heat to the gas as by including a heater element with the structure of the circuit breaker. In this manner, workers in the art have utilized what heretofore has been regarded as the optimum benefits of an electronegative gas while avoiding the highly undesired effects of liquefication. However, the added heating means also adds a continuing maintenance and reliability problem.

Another problem associated with prior art high-pressure gas switches is the difficulty in maintaining the relatively high pressure levels within the enclosed chamber. In order to maintain the high-pressure levels, particularly for underground or unattended installations, it has been necessary to provide either elaborate sealing means as part of the enclosed chamber, or gas-filled, pressurized containers external to the enclosed chamber and in communication therewith.

The gas-insulated switch, in accordance with the present invention, overcomes the problems associated with prior art switch gear by combining the concept of electronegative gas switching in a unique distribution switch configuration, thereby to provide a compact and relatively maintenance-free distribution switch which is particularly suited to installation below ground and at ground level.

SUMMARY OF THE INVENTION

Briefly, the present invention provides a gas-insulated switch suitable for use in underground distribution systems. The switch comprises a conductive housing with at least one pair of insulated, feed-through bushings fixedly mounted to the housing. Each bushing includes a first conductive portion external of the housing for coupling to an underground conductor termination and each bushing includes a second conductive portion internal to the housing. First and second electrodes are respectively coupled to the conductive portions of the pair of bushings. Means are provided for moving the electrodes relative to one another during a switching operation to alternately engage and disengage the electrodes so that a circuit is completed when the electrodes engage and the circuit is interrupted when the electrodes disengage. An electronegative gas is provided within the housing for extinguishing an electric arc which is drawn between the electrodes during a portion of the switching operation, and for insulating the individual electrodes with respect to each other and with respect to the conductive housing. The gas is maintained within the conductive housing at a relatively low pressure to prevent liquefication of the gas at relatively low ambient temperatures.

In a preferred embodiment of the invention means are provided for directing a stream of the gas into the arc during the switching operation. However, it should be understood that other configurations can be used satisfactorily within the scope of the present invention. Some of the configurations we have successfully constructed and tested include: plainbreak truss blade contacts; truss blade contacts with a "buggy-whip" or quick-break auxilliary arcing contact; doublebreak truss contacts; and tulip or plug and socket contacts; all of which provide successful operation without gas directing means. The illustrated embodiment of the invention is preferred because of relatively low arc energies experienced during circuit interruption. For example, in comparing a 600 ampere "puffer-type" interruption to a 600 ampere plain-break truss contact type interruption, the arc energy was only approximately 1/30 as much as the arc energy of the plain-break type.

BRIEF DESCRIPTION OF THE DRAWING

The advantages of this invention will become more readily appreciated as the same becomes better understood by reference to the following detailed description when taken in conjunction with the accompanying drawing wherein.

DETAILED DESCRIPTION

Figure 1:
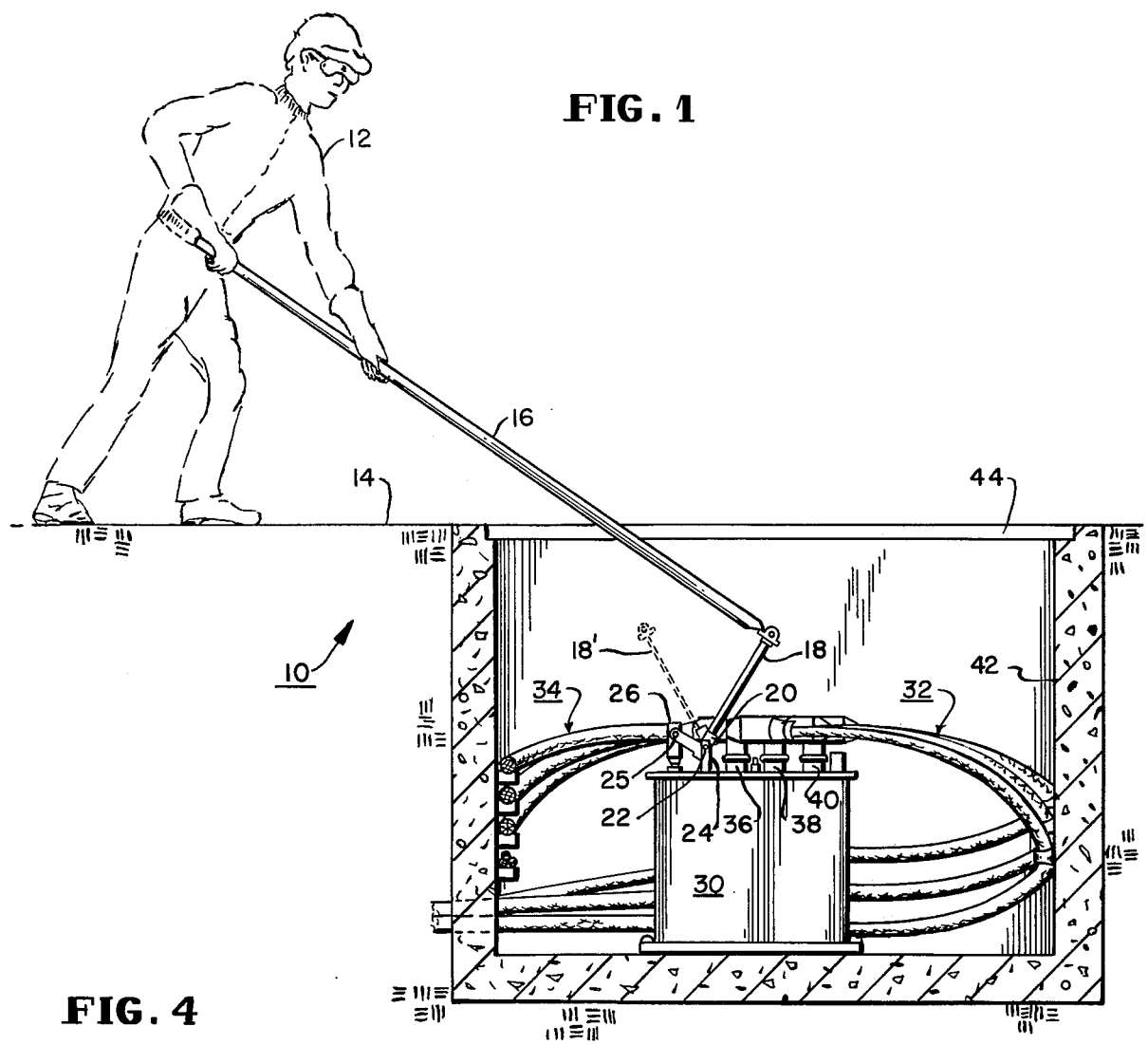
FIG. 1 is a pictorial illustration of a typical underground application of the gas-insulated switch in accordance with the present invention.

Referring now to FIG. 1 there is shown generally at 10 a typical application of the underground distribution switch of the present invention. A workman 12 is shown standing on the surface of the earth 14 and holding a "hot-stick" or lanyard 16. The remote end of the lanyard 16 includes a hook or other suitable means adapted for temporary coupling to a first end of a lever arm 18. The other end of lever arm 18 is secured to one end of a rocker arm 20 which, in turn, is pivotally mounted at 22 to a fixed support member 24. The other end of rocker arm 20 is pivotally mounted at 25 to one end of a switch arm 26. Arm 26 is movably mounted, for vertical movement, in a suitable opening of the housing of a gas-insulated switch 30. Switch 30 is adapted to receive three-phase, power source cable terminations 32 and load cable terminations 34 respectively by way of front bushings 36, 38, and 40, and rear bushings 36', 38' and 40' (not shown). Switch 30 is mounted to the floor of a concrete vault 42, and vault 42 includes a top cover 44 having a suitable opening therein to accept the remote end of lanyard 16. In the operation of switch 30 of FIG. 1, workman 12 completes or interrupts the underground distribution circuit by moving lever arm 18 to one of its alternate positions as depicted at 18 and 18'.

Figure 2:
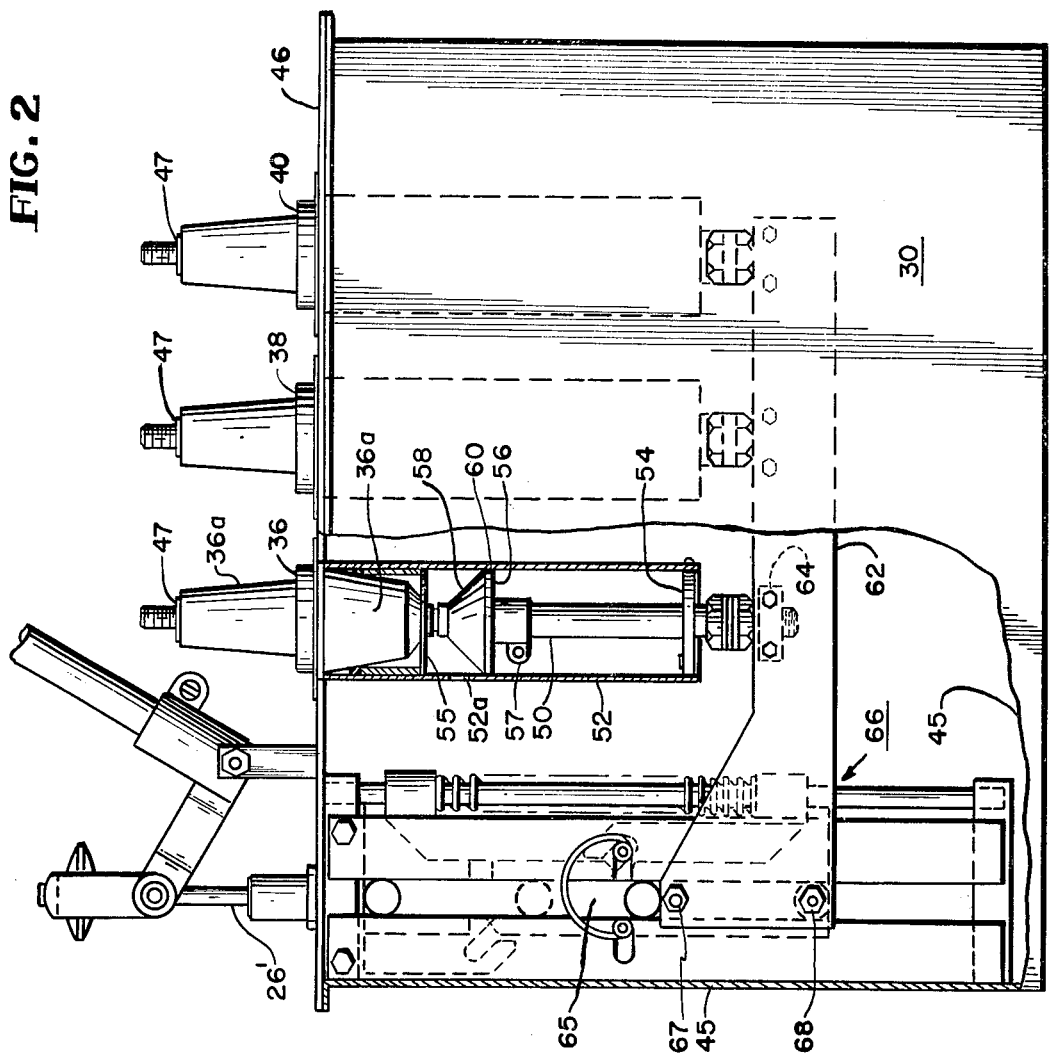
FIG. 2 illustrates a fragmentary side elevation view of the internal structure of the switch shown in FIG. 1.

FIG. 2 shows a fragmentary side view of switch 30 of FIG. 1, illustrating the internal structure of the gas-operated switch in accordance with the present invention. Switch 30 of FIG. 2 includes a hermetically sealed housing 45 including a top surface portion 46. Insulated bushings 36, 38 and 40 are mounted on surface 46.

Bushings 36, 38 and 40 comprise an insulated portion, as at 36a, projecting internally and externally of housing 45 of switch 30. Bushing 36, 38 and 40 also individually include a conductive member 47 feeding therethrough. The external end of member 47 has a reduced and threaded cross-section to facilitate connection to an underground cable termination. The internal end of member 47 includes a threaded bore as shown at 47a in FIG. 5.

Figure 5:
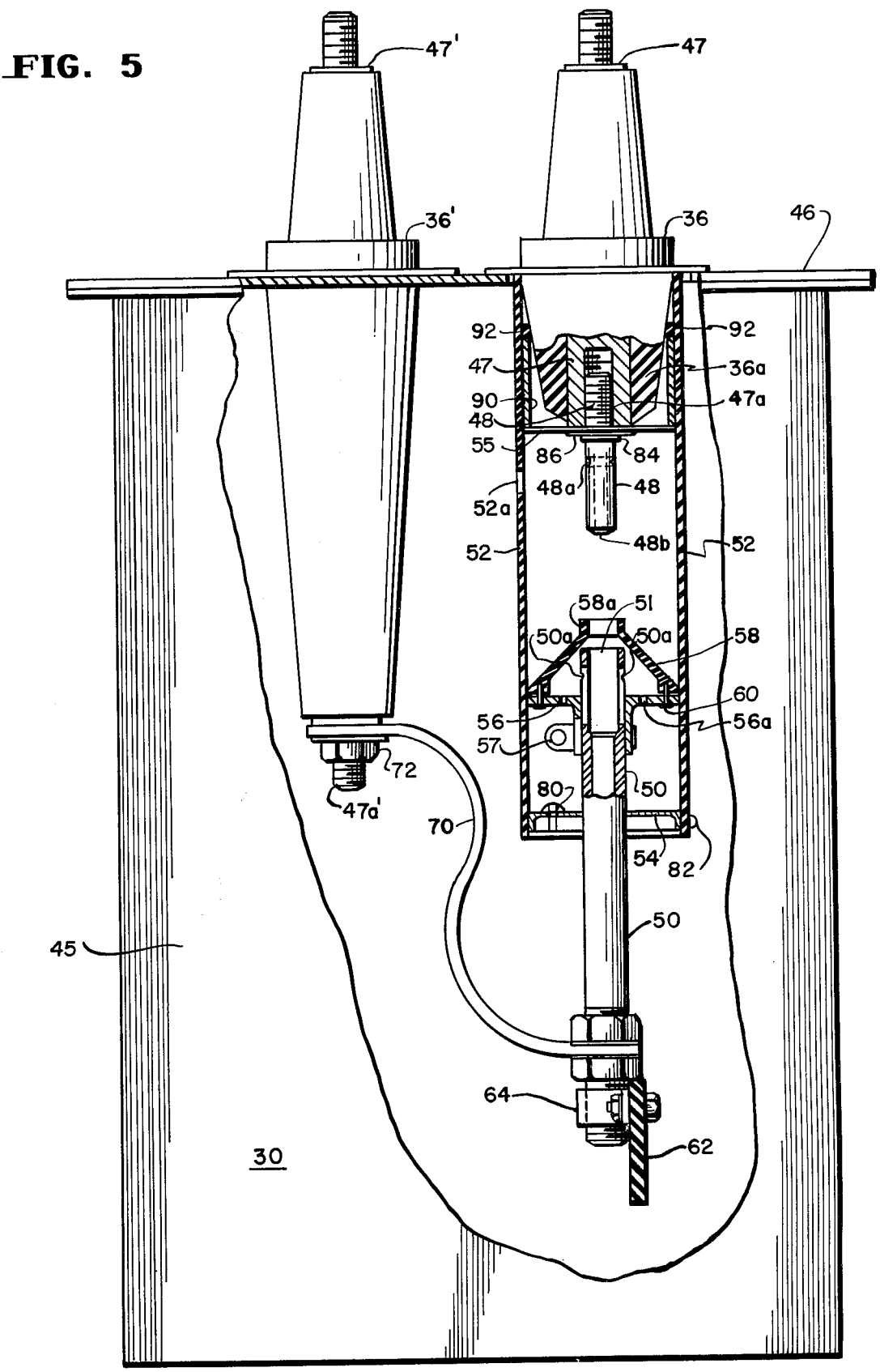
FIG. 5 is a view similar to FIG. 3 but which differs by showing a fragmentary sectional view taken along the line 5—5 of FIG. 4.

Bore 47a, as best illustrated in FIG. 5, threadedly engages the upper portion of a male electrode 48, and male electrode 48 slidably engages a female electrode 50. Female electrode 50 is concentrically and movably mounted within a casing 52 by way of fixedly mounted disk 54. Casing 52 is suitably attached to bushing 36 by way of a mounting disc 55. The upper end of female electrode 50 extends through a slidably mounted disk 56. Disk 56 is fixedly secured to female electrode 50 by means of a clamp 57. Disk 56 is further secured to a cone 58 as by a screw fastener 60.

As will be described in greater detail with reference to FIG. 5, electrodes 48 and 50 are arranged within casing 52 to provide a "puffer" switch. As known in the art, a puffer switch acts to provide a blast of gas through the associated electrodes during the portion of the switching operation when the electrodes disengage. Hermetically sealed housing 45 of switch 30 encloses a volume of electronegative gas such as $SF_6$. The inner chamber of casing 52 communicates with the enclosed volume of housing 45 of switch 30 by way of an opening in casing 52 as at 52a.

The lower end of female electrode 50 is secured to an insulating crossbar 62 by suitable fastening means such as a half-round clamp 64. Crossbar 62 is also fastened to the female electrodes corresponding to bushings 38 and 40 in a similar manner. Finally, crossbar 62 is also coupled to a moving member or output arm 65 of a snap-action switch 66 as by nut and bolt fastening means 67 and 68. The function and structure of snap-action mechanism 66 is described in greater detail in the co-pending application of M. Bussen and G. Schurter, Ser. No. 432,065 filed even date herewith and assigned to the same assignee as the present invention. Briefly, mechanism 66 functions to provide a reversible snap-action, linear translation of crossbar 62 after switch arm 26' is translated a given vertical distance to thereby alternately engage and disengage each associated electrode pair.

Figure 3:
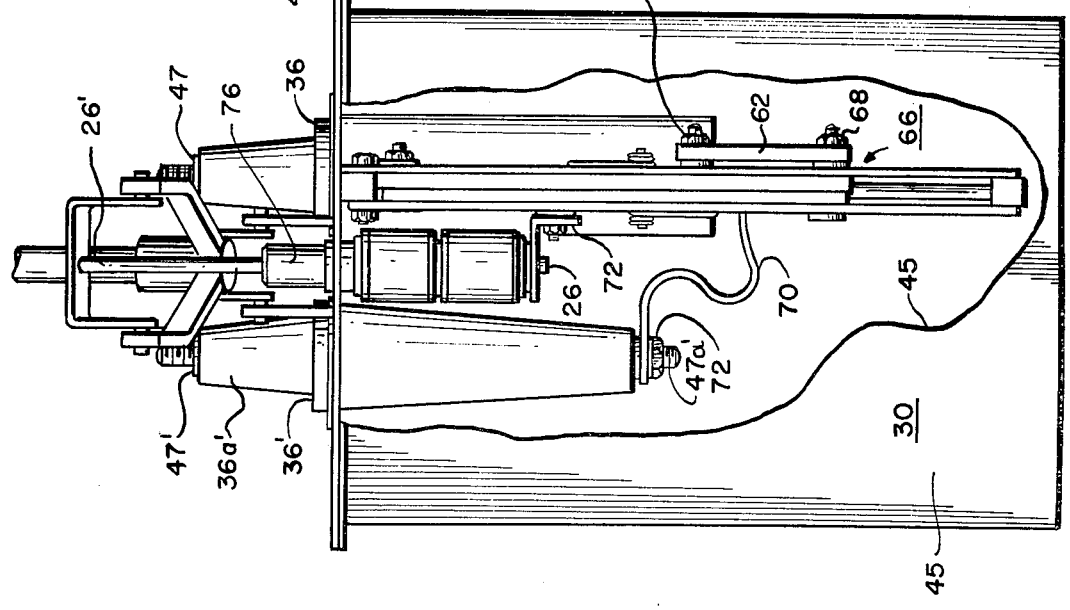
FIG. 3 illustrates an end view of the internal structure of the switch illustrated in FIG. 2.

Referring now to FIG. 3 there is shown a fragmentary end view of the internal structure of switch 30. A second insulated bushing 36' is also mounted on surface 46 and includes a conductive member 47' having a reduced cross-section essentially identical to that of member 47 of bushing 36. Member 47' projects internally of the housing of switch 30 and includes a threaded portion of reduced cross-section as shown at 47a'. A flexible cable or strap 70 is coupled to conductor 47' and secured thereto by a nut 72. The other end of strap 70 is similarly secured to the lower end of female electrode 50. Bushings 36 and 36' thereby provide a pair of switch contacts adapted for coupling to an external underground power distribution circuit. Switch arm 26' is secured to angle bracket 72 of the input arm of snap-action mechanism 66. Arm 26' is slidably mounted within a collar 76 which, in turn, is sealed to surface 46 of housing 45 of switch 30.

Figure 4:
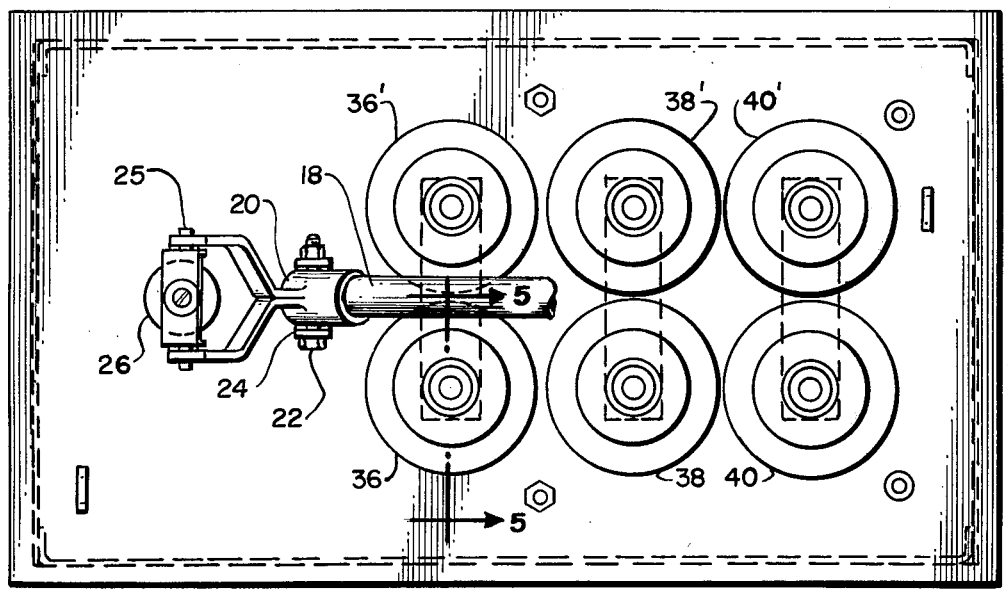
FIG. 4 is a top view of the switch depicted in FIGS. 2 and 3.

FIG. 4 illustrates a top view of switch 30 as depicted in FIGS. 2 and 3. Bushings 36–40 respectively cooperate with bushings 36'–40' to provide three pairs of switch contacts to accommodate a three-phase distribution system.

Referring now to FIG. 5 there is shown a fragmentary end view of switch 30 with a sectional view of the puffer switch mechanism associated with bushing 36 as taken along line 5—5 of FIG. 4. In FIG. 5, electrodes 48 and 50 are shown in their open or disengaged position. The lower disk 54 carries a valve 80 mounted thereon. Valve 80 opens and permits the gas enclosed by the housing of switch 30 to flow into the volume defined by casing 52 when the gas pressure within the casing is less than the gas pressure external of casing 52. However, when the gas pressure within casing 52 is greater than the gas pressure external to the casing, valve 80 remains closed. Disk 54 is secured to casing 52 by fastening means 82 and a suitable sealant to form a relatively gas-tight seal.

Cone 58 is suitably tapered and formed to provide a cylindrical upper portion 58a. The inside diameter of upper portion 58a of cone 58 cooperates with the outside diameter of male electrode 48 to provide a slidable but relatively gas-tight seal. Similarly, the outside diameter of disk 56 cooperates with the inside diameter of casing 52 to provide a slidable but relatively gas-tight seal. The upper portion of male electrode 48 threadedly engages the threaded bore 47a of member 47. Male electrode 48 includes a flange portion 84 which secures a washer 86 and mounting disk 55 to bushing 36. The outer periphery of mounting disk 55 engages an inner collar 90. The upper portion of collar 90, in turn, engages an O-ring 92 which provides a relatively gas-tight seal between bushing 36, collar 90 and casing 52. Disks 54, and 56 and cone portion 58 are preferably constructed of a material such as Teflon.

Male electrode 48 includes transverse bores 48a which communicate with a longitudinal bore 48b, thereby to provide a passageway therein. Female electrode 50 also includes a longitudinal bore 51. The upper portion of female electrode 50 is provided with plurality of longitudinal slits 50a which resiliently engage male electrode 48 and otherwise provide openings which communicate with the longitudinal bore 51 of electrode 50. Finally, disk 56 includes one or more apertures 56a. It should be noted that transverse bores 48a, longitudinal bore 48b, longitudinal bore 51, slits 50a and apertures 56 cooperate to provide a continuous passageway between the upper and lower portions of casing even when electrodes 48 and 50 are engaged.

The operation of the puffer switch of FIG. 5 is described as follows. Assuming initially that the electrodes are in their closed position, it can be seen that when crossbar 62 is caused to move in a downward direction, in response to the action of snap-action mechanism 66, the volume of casing 52 between disks 54 and 56 is decreased and the volume of gas between disks 54 and 56 is therefore compressed. When the upper portion 58a of cone 58 is below the upper portion of transver bores 48a of male electrode 48, an initial flow of gas is established between the compressed volume of gas and opening 52a in cylinder 52. That is, the compressed gas flows through apertures 56a in disk 56, through slits 50a in the upper portion of female electrode 50, through longitudinal bore 48b of male electrode 48, through the transverse bores 48a and out of casing 52 by way of opening 52a. Thus, an initial gas flow is established prior to the actual disengagement of electrodes 48 and 50. The initial flow of gas through the longitudinal bore 48b of male electrode 48 continues until electrodes 48 and 50 initially separate. Once electrode separation occurs, a blast of gas is provided between the separating electrodes. At this time the flow is provided through apertures 56a in disk 56 and out through the upper portion 58a of cone 58. It should be noted that by providing the above described initial flow, the subsequent blast is further enhanced. Thus, in an underground switching application, the arc developed between electrodes 48 and 50 during a switching operation, is rapidly extinguished by virtue of the blast of electronegative gas provided by the structure in accordance with FIG. 5.

During the alternate switching operation, when electrodes 48 and 50 are caused to engage in response to the action of mechanism 66, the operation of the puffer switch of FIG. 5 is as follows. Initially, upper portion 58a of cone 58 engages male electrode 48. If valve 80 were not open prior to engagement of electrodes 48 and 50, a reduced pressure would result in the volume of casing 52 between disk 54 and cone 58. Consequently, the gas density in the area between electrodes 48 and 50 would be correspondingly decreased. Accordingly, the effectiveness of the electronegative gas as an insulating medium during engagement of electrodes 48 and 50 would be correspondingly decreased allowing excessive arcing prior to engagement of electrodes 48 and 50. However, at this time, valve 80 is open and acts to equalize the pressure differential between electrodes 48 and 50, thus greatly reducing arcing time prior to electrode engagement. Hence the excellent insulating properties of the electronegative gas are maximized during the "pre-strike" portion of the engaging operation.

It should be noted that casing 52 may comprise either an insulated or a metallic housing. For example, in certain embodiments of the present invention it may be desirable to provide a metallic housing in order to provide a more uniform electric field between the electrodes of the puffer switch. Housing 45 may also be of either an insulated or metallic construction. However, even when constructed of an insulating material, housing 45 is preferably provided with conductive surfaces to avoid the accumulation of a static charge which, in turn, may result in an operating hazard.

Hermetically sealed housing 45 preferably includes a gas charging valve (not shown) mounted on a suitable surface thereof to facilitate introduction of the electronegative gas. The operating gas pressure is preferably in the range of 0–20 psig. In one constructed embodiment, the gas-insulated switch, in accordance with the present invention, provided a 15 KV, 600 Amp. three-phase power switch. The switch was pressurized with $SF_6$ gas at a pressure level of 5 psig at 70° F. which is only 5 psi greater than one atmosphere. The switch provided successful operation including a BIL (Basic Impulse Level) rating of 95 KV even though the total volume defined by the housing was only approximately 5.2 cu. ft. and the pressure of the electronegative gas was less than two atmospheres.

It will be appreciated by those skilled in the art that prior art compressed-gas circuit interrupters, in order to optimize the arc-quenching ability of the gas, are operated at high-pressure levels up to and including 20 atmospheres of gas pressure. It will also be appreciated by those skilled in the art that the relatively low pressure level operation as provided by the switch in accordance with the present invention eliminates the attendant sealing problem of prior art switchgear. Moreover, since the gas-insulated switch of the present invention preferably operates within a gas pressure range of 0 to 20 psig, the switch can be operated at relatively low ambient temperatures without the resulting hazard of the gas becoming liquefied as in prior art switchgear.

It has been found that since an electronegative gas also provides means for insulating individual bushing pairs from one another, a gas-insulated switch, in accordance with the present invention, can be constructed in a relatively compact size. Hence the gas-insulated switch can be installed in a small narrow vault. This feature not only reduces its installed cost, but it also allows many applications where larger equipment would not fit. Additionally, since the gas-insulated switch in accordance with the present invention uses a relatively stable gas for an insulating and an arc extinguishing medium, there is no danger of the catastrophic failure and fire hazard that is possible with oil-filled equipment. Further, since the switch is insulated with a relatively stable gas and since it has no exposed electrical parts, it is also suitable for use in indoor electrical vaults.

What has been taught, then, is a gas-insulated swisch particularly suitable for underground distribution (UD) systems. The form of the invention illustrated and described herein is the preferred embodiment of these teachings, in the form currently preferred for manufacture. It is shown as an illustration of the inventive concept, however, rather than by way of limitation, and it is pointed out that various modifications and alterations may be indulged in within the scope of the appended claims.

Having thus described the invention, what we claim as new and desire to protect by United States letters patent is:

1. A gas-insulated switch for use in underground distribution systems, said switch comprising, in combination:
   a conductive housing;
   at least one pair of insulated feed-through bushings fixedly mounted to said housing, each bushing having a first conductive portion thereof external of said housing for coupling to an underground conductor termination, and each bushing having a second conductive portion internal to said housing;
   first and second electrodes respectively coupled to said second conductive portions of said pair of bushings;
   means for moving said electrodes relative to one another during a switching operation to alternately engage and disengage said electrodes, wherein a circuit is completed when said electrodes engage and wherein an electric arc is drawn between said electrodes during a portion of said switching operation;
   an electronegative gas within said housing for extinguishing said arc, and for electrically insulating said electrodes from one another and from said conductive housing, and wherein said gas is maintained within said conductive housing at a pressure sufficient to prevent liquefication of said gas at relatively low ambient temperatures;
   means including a casing internal to said housing and surrounding said electrodes and an insulated portion of one of said bushings for directing a stream of said gas into said arc during said switching operation;
   wherein at least the portion of said casing which surrounds said insulated portion of said one of said bushings comprises an insulating material; and
   means for sealingly engaging the insulated portion of said casing with said insulated portion of said one of said bushings along a portion thereof which is spaced apart from said second conductive portion of said one of said bushings.

2. The switch according to claim 1, wherein said means for directing a stream of gas includes means for equalizing the gas pressure in said casing when said electrodes engage.

3. The switch according to claim 1, wherein said electronegative gas is $SF_6$.

4. The switch according to claim 3, wherein said $SF_6$ gas is pressurized in said housing at a value within the range of 0 to 20 psig.

5. The switch according to claim 3, wherein said housing is hermetically sealed.

6. The switch according to claim 5, wherein said means for moving said electrodes includes a snap-action mechanism positioned within said housing.

7. The switch according to claim 1, including at least three pairs of said bushings and means for coupling said three pairs of bushings to a three-phase underground distribution system.

8. The switch according to claim 1, including valve means mounted on a portion of said casing for equalizing the gas pressure in said casing when said electrodes engage.

9. The gas insulated switch according to claim 1, wherein said casing includes a cylinder of insulating material and wherein said sealingly engaging means comprises an "O"-ring circumferentially disposed about said insulated portion of said one of said bushings and engaging said casing in gas-tight relationship therewith.

10. The gas insulated switch according to claim 9 including a valve mounted on a lower portion of said casing which opens when the pressure of said gas within said casing is less than the pressure of said gas external to said casing.

11. A self-contained and hermetically sealed gas-insulated switch for use in power distribution systems, said switch comprising, in combination:
   a conductive and hermetically sealed housing;
   at least one pair of insulated feed-through bushings fixedly mounted to said housing, each bushing having a first conductive portion thereof external of said housing for coupling to an underground conductor termination, and each bushing having a second conductive portion internal to said housing;
   first and second electrodes respectively coupled to said second conductive portions of said pair of bushings;
   means for moving said electrodes relative to one another during a switching operation to alternately engage and disengage said electrodes, wherein a circuit is completed when said electrodes engage and wherein an electric arc is drawn between said electrodes during a portion of said switching operation;

an electronegative gas within said housing for extinguishing said arc, and for electrically insulating said electrodes from one another and from said conductive housing, wherein said gas is maintained within said conductive housing at a pressure within the range of 0 to 20 psig. thereby to prevent liquefication of said gas at relatively low ambient temperatures and to permit said housing to be sealed without necessitating an external gas containing storage reservoir;

means including a casing internal to said housing and surrounding said electrodes and a portion of one of said bushings for directing a stream of said gas into said arc during said switching operation; and said casing having at least one opening therein wherein the internal portion of said casing communicates with the internal portion of said housing which is external to said casing whereby the normal pressure of said gas within said casing is equal to the pressure of said gas external to said casing.

12. A gas-insulated switch for use in a power distribution system, said switch comprising, in combination:

a conductive housing;

at least one pair of insulated feed-through bushings fixedly mounted to said housing, each bushing having a first conductive portion thereof external of said housing for coupling to a conductor termination, and each bushing having a second conductive portion internal to said housing;

first and second electrodes respectively coupled to said second conductive portions of said pair of bushings;

means for moving said electrodes relative to one another during a switching operation to alternately engage and disengage said electrodes, wherein a circuit is completed when said electrodes engage and wherein an electric arc is drawn between said electrodes during a portion of said switching operation;

an electronegative gas within said housing for extinguishing said arc, and for electrically insulating said electrodes from one another and from said conductive housing, and wherein said gas is maintained within said conductive housing at a pressure sufficient to prevent liquefication of said gas at relatively low ambient temperatures;

means including a casing internal to said housing and surrounding said electrodes and an insulated portion of one of said bushings for directing a stream of said gas into said arc during said switching operation;

wherein at least the portion of said casing which surrounds said insulated portion of said one of said bushings comprises an insulating material; and, means for sealingly engaging the insulated portion of said casing with said insulated portion of said one of said bushings along a portion thereof which is spaced apart from said second conductive portion of said one of said bushings.

13. The switch according to claim 12, including at least two pairs of said bushings and means for coupling said bushings to a multi-phase underground distribution system.

* * * * *